(12) United States Patent
Tsirkin

(10) Patent No.: US 11,567,884 B2
(45) Date of Patent: *Jan. 31, 2023

(54) EFFICIENT MANAGEMENT OF BUS BANDWIDTH FOR MULTIPLE DRIVERS

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,800

(22) Filed: Jul. 26, 2021

(65) Prior Publication Data

US 2021/0357339 A1 Nov. 18, 2021

Related U.S. Application Data

(63) Continuation of application No. 16/802,143, filed on Feb. 26, 2020, now Pat. No. 11,074,202.

(51) Int. Cl.
*G06F 13/16* (2006.01)
*G06F 13/42* (2006.01)

(52) U.S. Cl.
CPC ...... *G06F 13/1668* (2013.01); *G06F 13/4221* (2013.01); *G06F 13/4234* (2013.01); *G06F 2213/0024* (2013.01)

(58) Field of Classification Search
CPC ............. G06F 13/1668; G06F 13/4221; G06F 13/4234
See application file for complete search history.

(56) References Cited

U.S. PATENT DOCUMENTS

| 7,231,475 | B1 | 6/2007 | Singla et al. | |
|---|---|---|---|---|
| 10,061,610 | B2 | 8/2018 | Zheng et al. | |
| 10,394,586 | B2 | 8/2019 | Tsirkin | |
| 11,074,202 | B1 * | 7/2021 | Tsirkin | G06F 13/1668 |
| 2004/0236880 | A1 * | 11/2004 | Barrett | G06F 11/0787 710/52 |
| 2013/0042056 | A1 * | 2/2013 | Shats | G06F 12/0871 711/E12.008 |

(Continued)

FOREIGN PATENT DOCUMENTS

DE 102015005744 A1 11/2015

OTHER PUBLICATIONS

Granovsky, Ilya, Perlin, Elchanan, IBM, "Integrating PCI Express IP in a SoC", https://lwww.design-reuse.comlarticles/15545/integrating-pci-express-ip-in-a-soc.html, 7 pages, [retrieved from the internet: 0212612020].

*Primary Examiner* — Phong H Dang
(74) *Attorney, Agent, or Firm* — Lowenstein Sandler LLP

(57) ABSTRACT

Systems and methods are disclosed for efficient management of bus bandwidth among multiple drivers. An example method may comprise: receiving a request from a driver to write data via a bus; reading contents of a random access memory (RAM) at a specified interval of time to determine whether the data written by the driver is accumulated in the RAM; responsive to determining that the data written by the driver is accumulated in the RAM, determining whether a bandwidth of the bus satisfies a bandwidth condition; and responsive to determining that the bandwidth satisfies the bandwidth condition, forwarding, via the bus, a portion of the data written by the driver in the RAM to a device memory of a device.

20 Claims, 5 Drawing Sheets

(56) References Cited

U.S. PATENT DOCUMENTS

| | | | |
|---|---|---|---|
| 2013/0159564 A1* | 6/2013 | Duncan | G06F 13/28 |
| | | | 710/26 |
| 2018/0113614 A1* | 4/2018 | Lee | G06F 3/0685 |
| 2018/0329743 A1 | 11/2018 | Pope et al. | |
| 2019/0018712 A1* | 1/2019 | Foxworth | G06F 3/0646 |
| 2019/0155511 A1* | 5/2019 | Tenner | G06F 9/5077 |
| 2019/0179788 A1 | 6/2019 | Hammer et al. | |

* cited by examiner

EFFICIENT MANAGEMENT OF BUS BANDWIDTH FOR MULTIPLE DRIVERS

RELATED APPLICATIONS

This application is a continuation application of U.S. patent application Ser. No. 16/802,143, filed Feb. 26, 2020, which is herein incorporated by reference.

TECHNICAL FIELD

The disclosure is generally related to computing systems, and more particularly, to efficient management of bus bandwidth for multiple drivers.

BACKGROUND

A driver is a software program that provides a programming interface to communicate with a lower level interface, such as, a specific type of hardware or other low-level service. For the case of hardware, the specific drivers controlling physical or virtual hardware are known as device drivers. A driver can provide software interface to hardware devices, enabling operating systems and other applications to access hardware functions without needing to know precise details about the hardware being used. A driver can act as a translation tool between an application layer and the hardware layer. For example, if a particular application needs to read some data from a device, the application can call a function that is implemented by the operating system (OS), and the OS can call a function implemented by the driver for the device. Since the driver is usually designed particularly for the device, the driver knows how to communicate with the device hardware to get the data from the device. The driver can return the data from the device to the OS, and the OS can return it to the application as requested. A driver communicates with the device through a computer bus or other communication subsystems to which the hardware connects. When a calling application invokes a routine in the driver, the driver can in turn issue a request (e.g., command) to the device using the bus.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
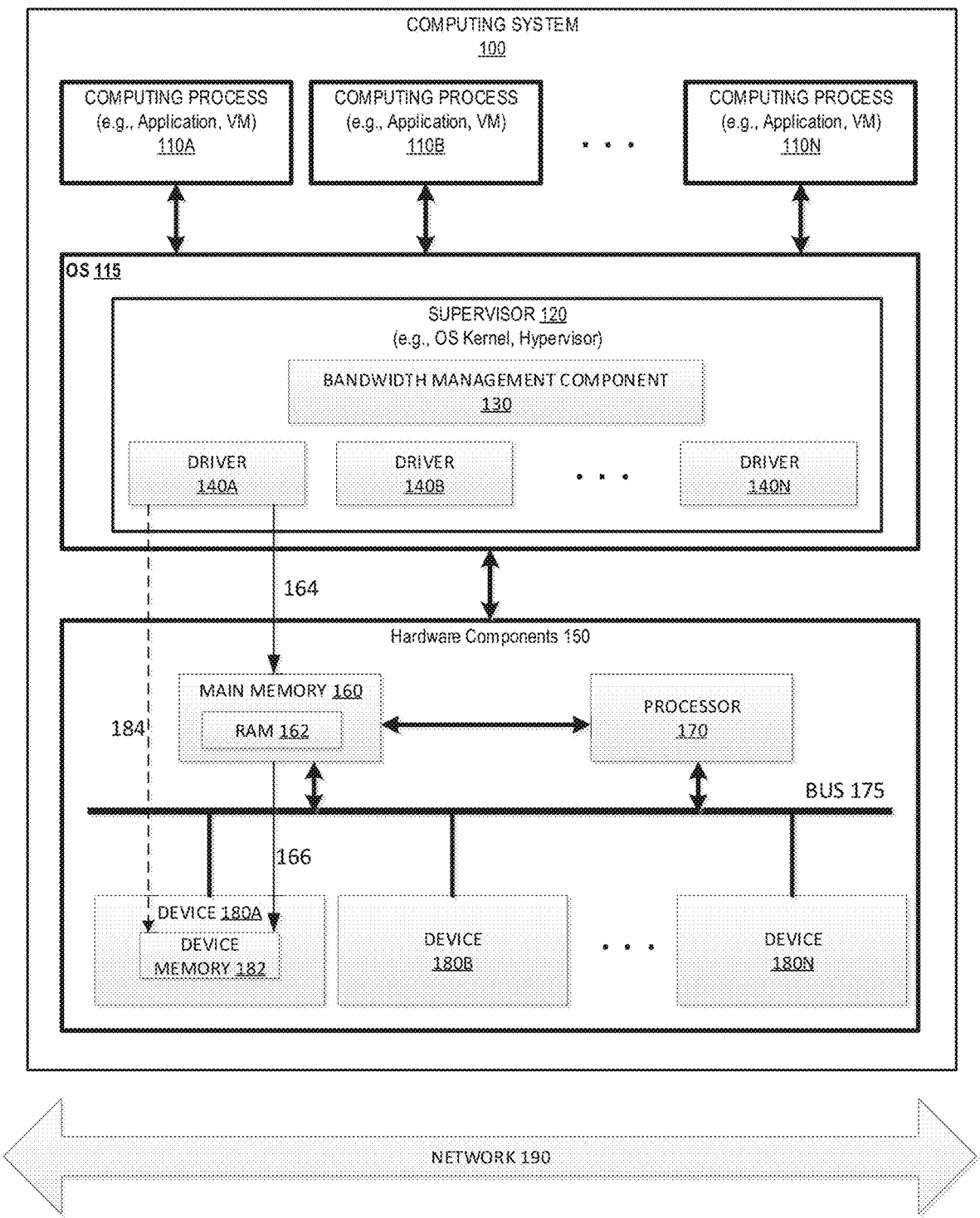
FIG. 1 depicts a illustrative architecture of an example computing system, in accordance with one or more aspects of the disclosure.

Described herein is a system for efficient management of bus bandwidth for multiple drivers. A computer bus is a communication system comprising hardware that transfers data between components inside a computer, or between computers. A computer bus conforming to the Peripheral Component Interconnect (PCI) specification can enable PCI-compliant hardware devices to be attached to the computer. Attached devices can take the form of an integrated circuit fitted onto the motherboard itself (called a planar device in the PCI specification) or an expansion card that fits into a slot installed on the motherboard. Examples of PCI cards used in personal computers and servers include network cards, sound cards, modems, USB ports, TV tuner cards and disk controllers.

A device may have a small portion of dedicated memory space, known as device memory, to store a limited amount of data. When a driver requests a service from the device, the driver may write into the device memory in order to communicate parameters associated with the service requested. However, in conventional systems, when a device is assigned to a driver, there is no meaningful limit placed on the amount of data that the driver can send to the device via the bus to write to the device memory. This can cause a fairness issue for other drivers in the computing system. A particular driver can send a large amount of small write requests for the device memory, which can exhaust all the available bandwidth of the bus. As a result, other drivers (e.g., drivers for applications, virtual machines, etc.) are prevented from requesting services using the bus and are prevented from running until the bus bandwidth is available again. Since the particular driver is allowed to send as many requests as it can and since the particular driver is not breaking any rules, ending the processes initiated by the particular driver to write to the device memory to accommodate other drivers is also not a reasonable option. A partial solution that is offered by the PCI specification is known as quality of service support, which allows static allocation of PCI bandwidth to a small number of applications. In particular, PCI specification provides a virtual channel ("VC") mechanism that partitions the PCI bandwidth in a limited number of dedicated channels and resources can be allocated to each virtual channel. Usually higher priority transactions are mapped to separate virtual channels, eliminating resource conflict with low priority transactions. However, the VC mechanism is limited to PCI devices only, so the device has to be PCI supported in order to avail this mechanism. Also, the partitions for the channels are not changeable dynamically without having to reset the device.

Aspects of the disclosure address the above and other deficiencies by providing technology that allows for efficient management of bus bandwidth among multiple drivers by centrally controlling the data flow to the device memory from various drivers. In implementations of the disclosure, the technology disclosed herein may involve receiving a service request from a driver for a service from a device. The service request can include a request to map the driver (e.g., map one or more addresses associated with the driver) to a device memory of the device. The driver-to-device mapping may allow the driver to write data on the device memory via a bus. As discussed in more detail below, instead of mapping the driver directly to the device memory, a supervisor (e.g., an OS kernel, a hypervisor, etc.) can allocate a portion of a main memory, such as portion of a random access memory (RAM), to initially write the data from the driver. Although the driver may not be aware that the driver is writing to the RAM, the driver-to-RAM mapping allows the driver to write the data into the RAM. As data from the driver accumulates (e.g., stored) in the RAM, the supervisor can periodically poll (e.g., check the status of) the RAM and forward the data, or a portion thereof, written by the driver in the RAM to the device memory via the bus if sufficient bandwidth is available on the bus. A threshold value can be used to determine whether a current value of the bandwidth is sufficient (e.g., satisfies the threshold value) to forward the data using the bus to the device. The supervisor can control various factors, such as, the amount of data to send to the device memory at a time, the percentage of time when a particular driver receives the allocation of the device memory, etc. Also, in another implementation, instead of mapping the driver to the RAM from the beginning (e.g., after receiving a service request), the driver-to-RAM mapping can take place dynamically if the supervisor detects that the computer system is stalled due to bandwidth availability issues.

As such, the systems and methods described herein include technology that enhances fairness to various processes, performance and efficiency of computer systems. In particular, aspects of the disclosure provide technology that enhances the efficiency and/or performance of a computing system by efficiently managing bus bandwidth for multiple drivers to allow each driver an opportunity to receive service from the devices. The mechanism allows an arbitrary number of applications to be able to receive services using the available bandwidth, without placing a limit on the number of applications and without limiting the applications to those that are higher in priority than others. This may enhance the performance of the computer as various applications and virtual machines are not prevented from receiving services from devices due to one, or a few, applications or virtual machines using up the limited available bandwidth of the bus and the devices.

FIG. 1 depicts an illustrative architecture of elements of a computing system 100, in accordance with an embodiment of the disclosure. In some implementations, the computing system 100 may be used to implement a bandwidth management component for efficient management of bus bandwidth for multiple drivers in accordance with implementations of the disclosure.

Computing system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. It should be noted that other architectures for computing system 100 are possible, and that the implementation of a computing system utilizing embodiments of the disclosure are not necessarily limited to the specific architecture depicted. In one example, computing system 100 may be a computing device implemented with x86 hardware. In another example, computing system 100 may be a computing device implemented with PowerPC®, SPARC®, or other hardware. In the example shown in FIG. 1, computing system 100 may include a supervisor 120, computing processes 110A-C, hardware components 150, and a network 140.

Supervisor 120 may manage the execution of one or more computing processes and provide them with access to one or more underlying computing devices (e.g., hardware resources or virtualized resources). Supervisor 120 may be the same or similar to a kernel and may be a part of an operating system (e.g., OS 115), hypervisor, or a combination thereof. Supervisor 120 may interact with devices 180A-N within hardware components 150 and provide hardware virtualization, operating-system virtualization, other virtualization, or a combination thereof. Hardware virtualization may involve the creation of one or more virtual machines (also referred to as "guest operating systems" hereafter) that emulate an instance of a physical computing machine. Operating-system-level virtualization may involve the creation of one or more containers that emulate an instance of an operating system. In one example, supervisor 120 may be a part of a non-virtualized operating system that is absent hardware virtualization and operating-system-level virtualization and each of the computing processes 110A-N may be an application process managed by the non-virtualized operating system. In another example, supervisor 120 may be a hypervisor or include hypervisor functionality and each of computing processes 110A-N may execute within a separate virtual machine ("VM") or container.

Computing processes 110A-N may include a sequence of instructions that can be executed by one or more processing devices (e.g., processor 170). A computing process may be managed by supervisor 120 or may be a part of supervisor 120. For example, supervisor 120 may execute as one or more computing processes that cooperate to manage resource accessed by computing processes 110A-N. Each computing process may be a thread, a process, other stream of executable instructions, or a combination thereof. A thread may be any computer based "thread of execution" and may be the smallest sequence of programmed instructions managed by a kernel 120. A process may include one or more threads and may be an instance of an executable computer program.

Drivers 140A-N may be any computer programs that is associated with one or more of devices 180A-N. Code for the drivers may include executable code of a device driver that operates or controls a particular type of device. Drivers 140A-N may enable computing processes 110A-N (e.g., applications) or supervisor 120 (e.g., kernel) to access functions of a device without being aware of how the device functions. The device driver may communicate with the device through a computer bus (e.g., bus 175) or other communication subsystem.

Drivers 140A-N may provide features (e.g., routines, functions, methods) that can be invoked by computing processes 110A-N or supervisor 120. In response to being invoked, a driver 140A may issue commands to the corresponding device. When the device sends data back to the device driver, the device driver may invoke routines in the original invoking program. Device drivers may be dependent on the supervisor type (e.g., operating-system type), processor type (e.g., instruction set architecture), or a combination thereof.

A user space device driver is a device driver that can be executed by a computing process that is running at a user mode privilege level (e.g., a user space process). In one example, the user space device driver may be based on a data plane development kit (DPDK). The DPDK may be a framework that includes a set of network interface controller drivers and data plane libraries that support fast packet processing for high speed data packet networking applications. In another example, the user space device driver may be based on a storage performance development kit (SPDK). The SPDK may be a framework that includes a set of storage controller drivers and libraries that support high performance storage applications. SPDK may enable storage drivers to execute in user space to avoid system calls (e.g., syscalls), hypervisor calls (e.g., hypercalls), or a combination thereof. SPDK may enable zero-copy access from application code. SPDK may also or alternatively enable polling hardware for completions instead of relying on interrupts and avoid (e.g., reduce or eliminate) locks in the I/O path instead relying on message passing.}

Computing system 100 may include hardware components 150, such as a main memory 160, processor 170, and devices 180A-N. Computing system 100 may include additional or different components, devices, and/or connectors in various implementations of the disclosure. Hardware components 150 may provide hardware functionality for performing various computing tasks.

Main memory 160 may include any persistent or non-persistent data storage that is capable of storing digital data. Main memory 160 may function as main memory for computer system 100 and may include one or more physical memory devices. The physical memory device may be the same or similar to volatile memory devices (e.g., RAM), non-volatile memory devices (e.g., NVRAM), other types of memory devices, or a combination thereof. As shown in FIG. 1, main memory 160 includes a random access memory (RAM) 162. A RAM is a form of memory that can be read and changed in any order, and is typically used to store working data and machine code. A RAM allows data items to be read or written in almost the same amount of time irrespective of the physical location of data inside the memory.

Processor 170 may refer to one or more processing devices or processing units that are capable of executing instructions that encode arithmetic, logical, or I/O operations. Processor 170 may be a single core computer processor capable of executing one instruction at a time (e.g., single pipeline of instructions) or may be a multi-core computer processor that simultaneously executes multiple instructions concurrently. Processor 170 may include features of a central processing unit (CPU), graphical processing unit (GPU), a microcontroller, other computer processor, or a combination thereof.

Processor 170 may implement an instruction set architecture (ISA) that functions as an interface between processor 170 and the computing processes being executed by processor 170 (e.g., computing processes 110A-C). The instruction set architecture may be the same or similar to x86 (e.g., Intel®, AMD®), PowerPC®, Advanced RISC Machine (ARM®), Scalable Processor Architecture (SPARC®), other computer architecture, or a combination thereof.

Network 190 may be a public network (e.g., the internet), a private network (e.g., a local area network (LAN), wide area network (WAN)), or a combination thereof. In one example, network 190 may include a wired or a wireless infrastructure, which may be provided by one or more wireless communications systems, such as a wireless fidelity (WiFi) hotspot connected with the network 190 and/or a wireless carrier system that can be implemented using various data processing equipment, communication towers, etc.

A bus can function as a connection or communication path between computer components and devices. A bus can, for example, connect processor 170 to memory 160, memory 160 and/or processor 170 to devices 180A-N, etc. A bus that is directly connected to processor 170 is typically referred to as a system or local bus. Other examples of buses include parallel and serial buses, both internal and external, such as a Peripheral Component Interconnect (PCI) bus, a Universal Serial Bus (USB), HyperTransport, Serial ATA, InfiniBand, etc. FIG. 1 shows an example of a bus 175. Bus 175 can have slots for connecting devices 180A-N to the bus 175. Various devices 180A-N, such as network cards, sound cards, modems, USB ports, TV tuner cards and/or disk controllers, may be attached to bus 175. In one implementation, bus 175 is a Peripheral Component Interconnect (PCI) bus.

Devices 180A-N may be any computing device that can receive a request and perform a computing task. The computing task may involve transmitting data (e.g., output data), receiving data (e.g., input data), or a combination thereof. Devices 180A-N may include physical devices, virtual devices, or a combination thereof. For example, devices 180A-N can include a storage device, a network interface device, a graphics device, etc. The storage device may include a storage controller associated with one or more mass storage devices that include solid-state storage (e.g., Solid State Drives (SSD)), hard drives, other persistent data storage, or a combination thereof. The network interface device may provide access to a network internal to computing system 100 or external to computing system 100 (e.g., network 190) and in one example may be a network interface controller (NIC). The graphics device may provide graphics processing for computing system 100. One or more of devices 180A-N may be combined into one or more physical devices (e.g., integrated devices) or may partially or completely emulated by a combination of computing resources. Computing resources may refer to the physical devices, virtual devices, of computing system 100 and may include a memory (e.g., main memory 160) and a processor (e.g., processor 170).

Each of the devices 180A-N, such as device 180A, may include a device memory. A device memory 182 of device 180A may be a memory mapped device, which is a portion of a memory that is mapped to the particular device 180A. Memory mapped device may be used to implement memory mapped input/output (I/O) and may be a region of virtual memory that when modified transmits data to one of the devices as opposed to main memory. In one example, when computing process 110A stores data to device memory 182, it may be stored in data storage of the device as opposed to main memory 160.

In the example shown in FIG. 1, supervisor 120 may include a bandwidth management component 130. Bandwidth management component 130 may enable supervisor 120 to efficiently manage bandwidth of bus 175 for multiple drivers 140A-140N within the computing system 100. Bandwidth management component 130 may use main memory 160 to initially store data from drivers 140A-N until the data can be forwarded to one or more of the devices 180A-N. Individual modules of bandwidth management component 130 is discussed in more detail in regards to FIG. 2.

Drivers 140A-N may provide features (e.g., routines, functions, methods) that can be invoked by computing processes 110A-N or supervisor 120. In response to being invoked, a driver 140A may issue commands to the corresponding device.

In one implementation, computing process 110A (e.g., a user application, a virtual machine, etc.) can invoke a function implemented by the OS 115, for example, to request a service from device 180A. The OS 115 may in return invoke a function implemented by driver 140A for the requested service. In an implementation, supervisor 120 may receive the service request from driver 140A for the service from device 180A. The service request can include an indication to map the driver 140A to device memory 182 of device 180A. The requested driver-to-device mapping is shown in FIG. 1 using the dotted line 184. The requested driver-to-device mapping 184 can allow the driver 140A to write data on device memory 182 via bus 175. In an example, the bus 175 can be a Peripheral Component Interconnect (PCI) bus and the device 140A can be a PCI-compliant device.

In one embodiment, in order to control bandwidth of bus 175 efficiently and using a central component, the supervisor 120 (e.g., bandwidth management component 130) may map the driver 140A (e.g., map one or more addresses associated with the driver) to main memory 160 instead of mapping the driver 140A to the device memory 182 as requested by the driver 140A. For example, the driver 140A can be mapped to RAM 162 of main memory 160. The driver-to-RAM mapping is shown in FIG. 1 using the arrow 164. The driver-to-RAM mapping 164 makes the driver 140A to write the data to RAM 162, instead of the device memory 182 of device 180A. In an example, mapping the driver to the RAM can include creating a map between requested addresses by the driver and the memory addresses of RAM 162 such that when the driver 140A writes the data, the data is stored in the memory addresses of RAM 162.

In an implementation, the supervisor 120 may "poll" the RAM 162, or portions thereof, to check the status of the RAM 162. Polling can refer to the action of sampling the status of a device (e.g., memory, CPU, etc.) by a software program. In an example, polling the RAM 162 can include reading contents of the RAM. The polling can be performed periodically at a specified interval of time. For example, the supervisor can poll the RAM 162 every 2 minutes. The polling may be done to determine whether any data written by any of the drivers 140A-N is accumulated in the RAM 162.

If the supervisor 120 determines that the data written by driver 140A (or from any other driver) is accumulated (e.g., stored) in the RAM 162, the supervisor 120 may then determine whether a bandwidth of the bus 175 satisfies a bandwidth condition. For example, a bandwidth may satisfy the bandwidth condition if a measure of the bandwidth is equal to or greater than a threshold value of the bandwidth. In an example, bandwidth of the bus can be measured by the amount of data carried by the bus per time unit. In simple terms, a maximum bandwidth of the bus can refer to the maximum amount of data that the bus (or a portion thereof) can carry per unit of time. A current bandwidth, as referred to herein, can refer to the amount of data currently being carried by the bus. An available bandwidth, as referred to herein, can refer to the remaining amount of data that the bus can accommodate in addition to the amount of data the bus is currently carrying before reaching the maximum bandwidth. For example, a maximum bandwidth for a channel of a particular type of bus may be 2 GB/second. Using the examples, a threshold value can be defined as 0.8 GB/second. In an example, the bandwidth condition is satisfied if the available bandwidth is equal to or greater than the threshold value of 0.8 GB/second. That is, the bus can accommodate an additional 0.8 GB of data per second based on the most recent bandwidth measurements. On the other hand, it can be said that the bandwidth condition is satisfied if the current bandwidth is less than another threshold value of 1.2 GB/second (e.g., maximum bandwidth minus first threshold value).

In an implementation, if the supervisor 120 determines that the bandwidth of the bus satisfies the bandwidth condition, the supervisor may forward a portion of the data written in the RAM 162 by driver 140A to the device memory 182 via the bus 175, as shown by arrow 166. In some example, forwarding the portion of the data can include sending the portion of the data in the RAM 162 to the device memory 182 to be stored in the device memory 182. In some example, forwarding the portion of the data can include swapping a portion of data in the registers of device memory 182 with the portion of the data written by the driver 140A in the RAM 162 using an atomic compare and swap instruction. An atomic compare and swap instruction compares the contents of a memory location with a given value to modify the contents of that memory location with a new given value. In some example, the supervisor may overwrite the portion of the data written by the driver 140A in the RAM 162 with an invalid data, such as data that the driver is known not to write. For example, the invalid data can be deduced based on the device identification and/or vendor that supplies the device. In another example, the invalid data can be supplied by the computing process 110A. For example, for a NIC card, writes can be used as doorbell or notification about availability of new memory buffers. It is noted that the term "doorbell" is used to describe a mechanism whereby a software system (e.g., computing processes 110A-C) can signal or notify a computer hardware device (e.g., hardware components 150) that there is some work to be done. In an example, for a Mellanox card (e.g., a type of NIC card), it is observed that the high bit in a doorbell notification is always "0." Thus, a pattern of 0xffffffff can be used as an invalid data to replace the data in RAM 162. Overwriting the portion in RAM 162 with invalid data allows for identifying whether subsequent changes to the RAM 162 are made by the driver by comparing the invalid data to the content of the RAM 162. For example, if driver 140A wrote the values "ABCD" in RAM 162, at the time the data is forwarded to the device memory 182, the portion in RAM 162 with the value "ABCD" can be overwritten with an invalid value "0000." Next time when the supervisor reads RAM 162 to identify whether any new data has been written in RAM 162 by a driver, if the value "ABCD" is found again, then the supervisor can determine that it is indeed a new value, since the previous "ABCD" value was overwritten with "0000." On the other hand, if "0000" is read, then supervisor determines that new data has not been written by the driver.

In implementations, supervisor 120 considers various factors when determining whether to forward certain data written by drivers in RAM 162. For example, each driver may be assigned a particular limit in terms of the amount of data it can write to device memory at a time. For example, supervisor 120 can limit driver 140A to write to device memory 10% of the time, whereas for driver 140B the limit can be 5%. It can also vary by the destination device. Another factor to consider is how much data is currently on device memory of a particular device that is being requested to write to. Additionally, supervisor 120 needs to have knowledge of the amount of data that a driver is going to write in order to compare the amount to available bandwidth and other factors.

In some implementations, responsive to determining that the bandwidth does not satisfy the bandwidth condition, the supervisor may continue to monitor the bus 175 bandwidth to determine whether the bandwidth changes to satisfy the bandwidth condition. Until the bandwidth is satisfied, the driver 140A can remain mapped to the RAM 162 and the writes from the driver 140A can accumulate in the RAM 162.

In some implementations, if the supervisor 120 determines that the driver 140A has not written to the RAM 162 for a specified amount of time (e.g., for the last 10 minutes), the supervisor can revert back to the driver-to-device mapping as requested by the driver 140A. This is done because polling the memory has a cost associated with it. For comparison purposes, a typical single CPU polling the memory can keep up with a large number of other CPUs running applications and VMs, for example, 63 CPUs running VMs. However, in order to save the cost of CPU resource for polling, if it is determined that the driver 140A hasn't written to the RAM 162 for a long enough time (as defined by the specified amount of time), the supervisor 120 can perform a write-protect operation to prevent writing by the driver 140A to the RAM 162 such that the driver 140A is not allowed to further write to the RAM 162. Then the supervisor may un-map the driver 140A from the RAM 162 and map the driver 140A to the device memory 182 (e.g., arrow 184) such that the driver can write directly to the device memory 182. This can continue until a change in the bandwidth of the bus 175 is detected to indicate driver-to-RAM mapping is suitable.

In an implementation, the supervisor 120 can detect a request (e.g., a read request) from the driver 140A to access (e.g., a read access) data from an area (e.g., some other area) in device memory 182 when the driver is mapped to the RAM 162. Upon detecting an access (e.g., read access) to the device memory 182, data from the RAM 162 that was previously written by the driver 140A can be forwarded or forced flushed to the device memory 182 so that the desired data that the driver 140A intends to retrieve or access can indeed be accessed properly. Although it is rare for drivers to request a read operation due to high latency with read operations, some interrupts may continue to use read operations. Thus, force flushing the data to device memory can ensure that when a read request by a driver is detected, the proper data can be retrieved. In some examples, the access request can be for a write access. Additionally, when the driver is mapped to the RAM 162, supervisor 120 can protect rest of the device memory 182 such that driver cannot access the device memory 182. In the alternative, when driver is mapped to device memory 182, supervisor 120 can make rest of the device memory 182 accessible to the driver.

In an embodiment, instead of mapping the driver 140A to the RAM 162 upon receiving the service request from the driver, the driver-to-RAM mapping can take place dynamically if the supervisor detects that the computer system is stalled due to bandwidth availability issues. For example, the supervisor can initially map the driver 140A to device memory 182 as requested by the driver 140A. Upon detecting that the bandwidth does not satisfy a first bandwidth condition (e.g., available bandwidth is less than 0.4 GB/second), the supervisor 120 may then un-map the driver 140A that is mapped to the device memory 182 and map the driver 140A to RAM 162 such that the driver 140 writes the data to the RAM 162 instead of the device memory 182.

Subsequently, if supervisor 120 determines that the data written by the driver 140A is accumulated in the RAM 162, the processing device may determine whether the bandwidth of the bus changed to satisfy a second bandwidth condition. In an example, the bandwidth of the bus can change over time to satisfy a second bandwidth condition. For example, the second bandwidth condition can be satisfied if the bandwidth changes to be equal to or greater than a second threshold value (e.g., available bandwidth is equal to or greater than 0.8 GB/second). In an example, the first bandwidth value and the second bandwidth value may be different. While the first bandwidth value may be used to identify whether there is a PCI stall that necessitates mapping the driver to the RAM, the second threshold value may be used to identify whether it is an appropriate time to forward some of the data from the RAM to the device memory considering other factors as well. As such, the two values may have different levels of threshold associated.

Figure 2:
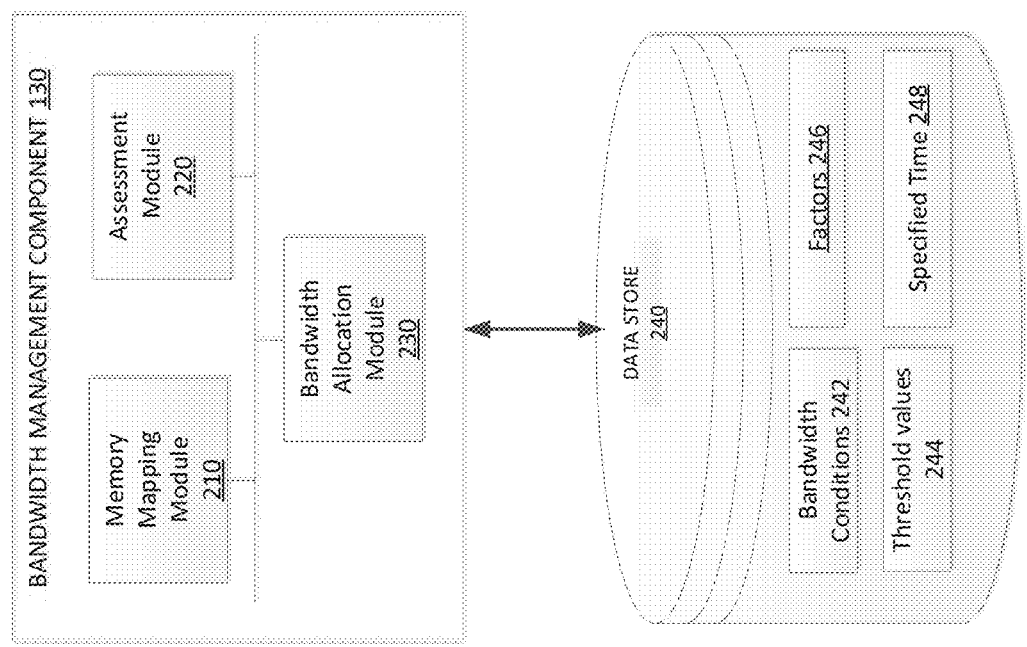
FIG. 2 depicts an example bandwidth management component for efficient management of bus bandwidth for multiple drivers, according to one or more aspects of the disclosure.

FIG. 2 depicts a block diagram illustrating an example bandwidth management component 130 for efficient management of bus bandwidth for multiple drivers, according to one or more aspects of the disclosure. In one embodiment, the bandwidth management component 130 can be the same as the bandwidth management component 130 of FIG. 1. Bandwidth management component 130 includes a memory mapping module 210, an assessment module 220, and a bandwidth allocation module 230. Note that in alternative embodiments, the bandwidth management component 130 may include more or less modules than those shown in FIG. 2. Also, two or more modules may be combined into a single module. Additionally, the functionality of any of the modules 210, 220, and 230 may be divided between multiple modules and sub modules. Data store 240 may include various data, including but not limited to, bandwidth conditions 242, threshold values 244, factors 246, specified time 248, etc. Data store 240 may be divided into multiple data stores that each store different types of data described herein.

In one implementation, memory mapping module 210 may be used to map driver 140A to a random access memory (e.g., RAM 162). The module 210 may map to the RAM 162 when the driver 140A requested to map the driver to the device memory 182. However, as part of the efficient bandwidth management process, instead of mapping the driver to the device memory the mapping module 120 maps the driver to the RAM. The driver-to-RAM mapping makes the driver to write the data to the RAM instead of the device memory of the device, although the driver does not have knowledge of this mapping. In one implementation, the initial request by the driver 140A to map to the device memory 182 may also be received by the mapping module 210. In other implementations, the request may be received by another module of the supervisor 120.

In one implementation, assessment module 220 may poll (e.g., check status of) the RAM 162 periodically, for example, by reading contents of RAM 162. The polling may be done to assess whether the data written by the driver is accumulated in the RAM. If it is determined that the data written by the driver 140A is accumulated in the RAM 162, the assessment module 220 proceeds to determine whether a bandwidth of the bus satisfies a bandwidth condition. For example, a bandwidth may satisfy the bandwidth condition if a measure of the bandwidth is equal to or more than a threshold value 244 stored in data store 240 (e.g., if available bandwidth is greater than a first threshold value of 0.8 GB/second, if current bandwidth of the bus is less than a second threshold of 1.2 GB/second, etc.). The assessment module 220 can assess other factors 246 stored in data store 240, such as, the amount of data to send to the device memory at a time, the percentage of time when a particular driver receives the allocation of the device memory, etc. to provide indication to bandwidth allocation module 230 to forward the data to the device memory 182. If it is determined that the bandwidth of the bus satisfies the bandwidth condition, and optionally other conditions based on factors 246, then assessment module 220 sends an indication to bandwidth allocation module 230 to forward the data to the device memory 182. The assessment module can indicate to forward a particular portion of the data based on the bandwidth and factors.

In one implementation, upon receiving indication from assessment module 220 to forward the data to device memory, bandwidth allocation module 230 may forward the portion of the data written by the driver 140A in the RAM 162 to the device memory 182 via the bus 175. As described with respect to FIG. 1, forwarding the portion of the data can include sending the portion of the data in the RAM to the device memory, swapping a portion of data in the registers of the device memory with the portion of the data in the RAM, overwriting the portion of the data written by the driver in the RAM with an invalid data after, or at the same time as, sending the data to device memory, etc.

Additionally, in one implementation, the mapping module 210 can also perform un-mapping of the driver 140A from RAM 162 or mapping to/un-mapping from device memory 182, as needed. For example, if it is determined that a specified amount of time 248 as identified in data store 240 has passed without the RAM 162 accumulating any data from driver 140A, then the mapping module 210 can un-map driver 140A from RAM 162 and map driver 140A to device memory 182. Other examples of un-mapping and mapping to RAM and device memory has been described with respect to FIG. 1.

Figure 3:
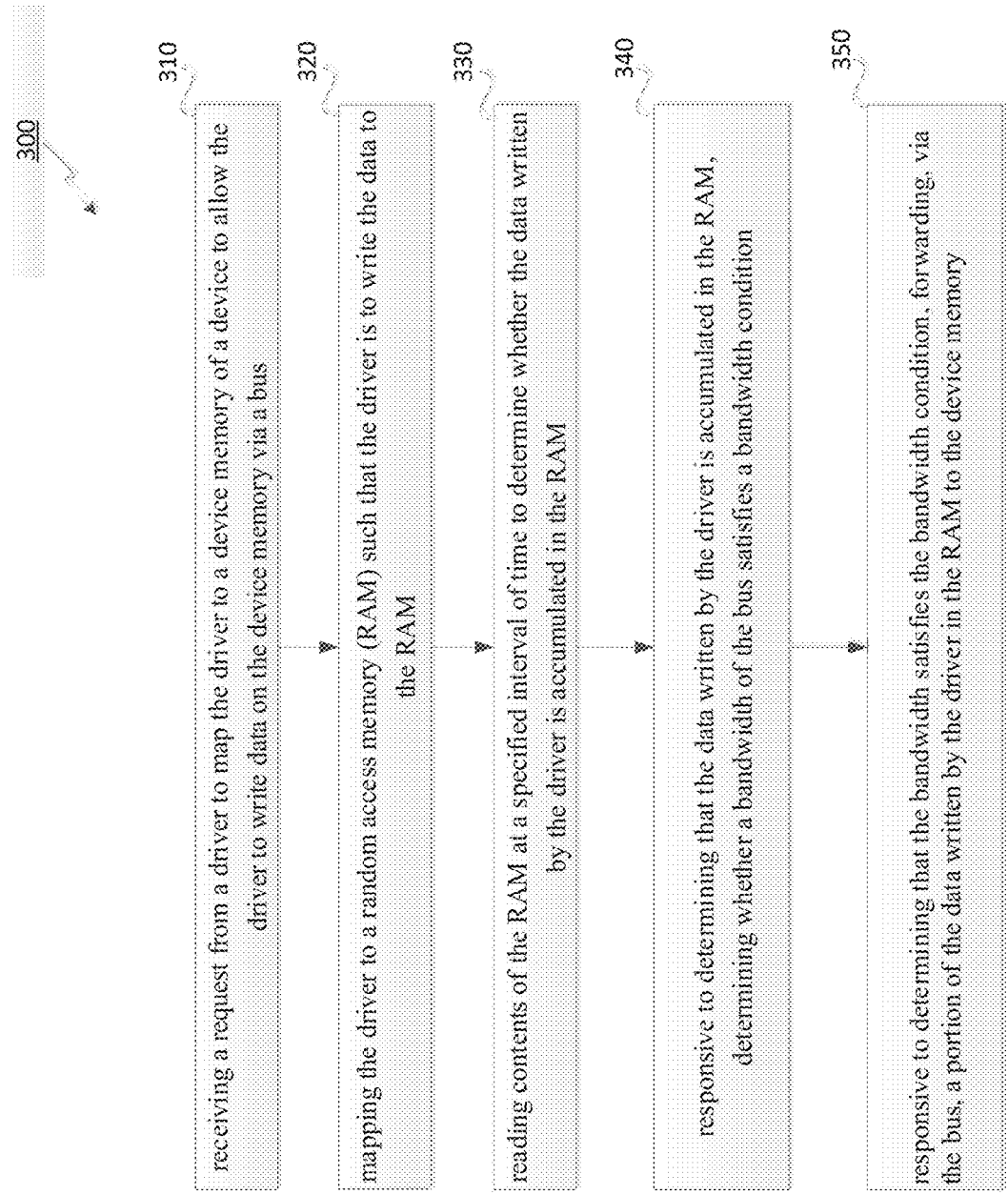
FIG. 3 depicts a flow diagram of an example method for proactive bandwidth management based on request for service by a driver, in accordance with one or more aspects of the disclosure.
Figure 4:
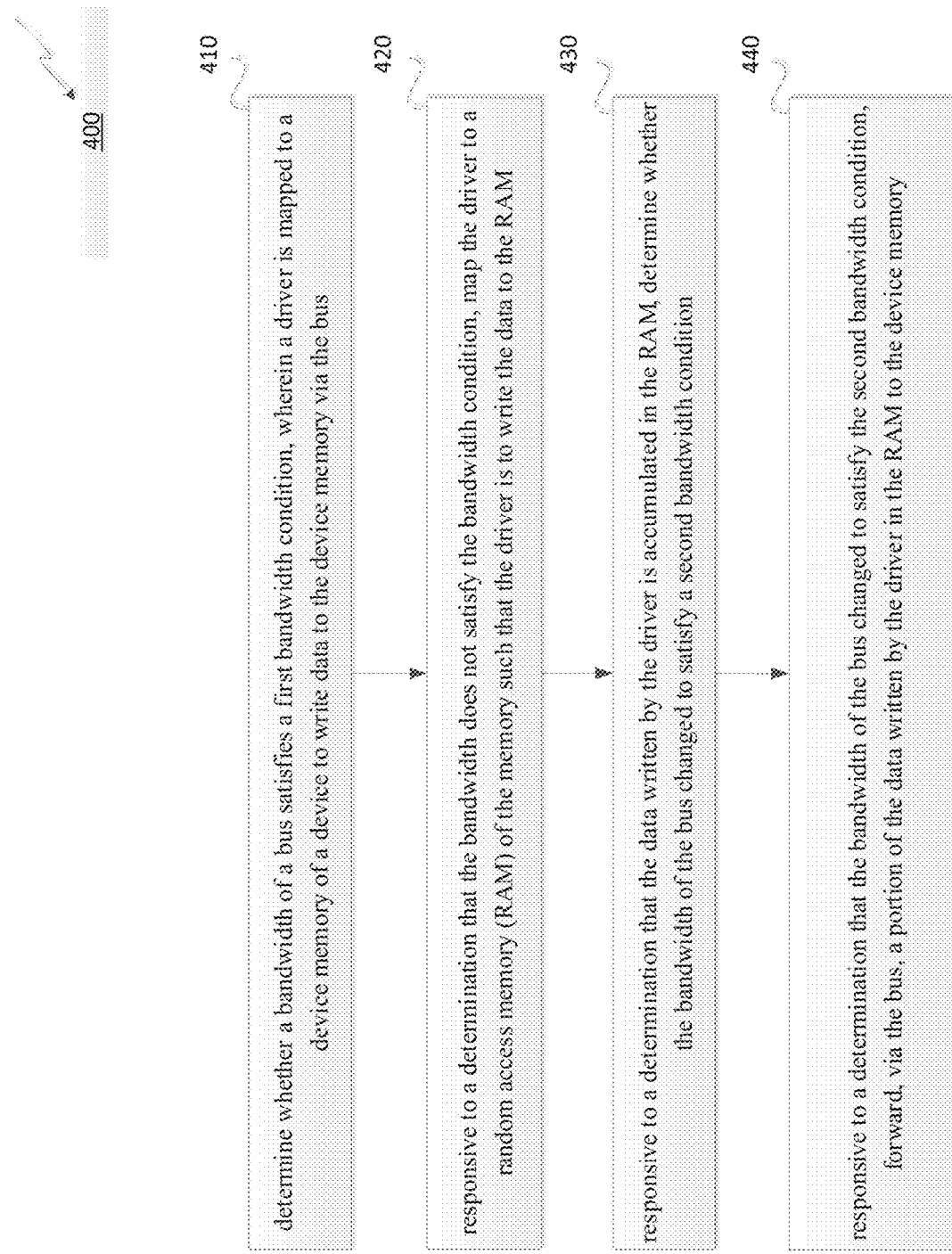
FIG. 4 depicts a flow diagram of an example method for reactive bandwidth management based on bandwidth availability of the bus, in accordance with one or more aspects of the disclosure.

FIGS. 3 and 4 depict flow diagrams for illustrative examples of methods 300 and 400 for efficient management of bus bandwidth among multiple drivers, in accordance with one or more aspects of the disclosure. Method 300 illustrates an example process flow for bandwidth management by proactively mapping to RAM based on any request for service. Method 400 is an example process flow for bandwidth management that is prompted by a bandwidth availability of the bus, according to at least one implementation.

Methods 300 and 400 may be performed by processing devices that may comprise hardware (e.g., circuitry, dedicated logic, programmable logic, microcode, etc.), executable code (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 300 and 400 may be performed by bandwidth management component 130 as shown in FIG. 1.

Referring to FIG. 3, method 300 may be performed by a processing device and may begin at block 310. At block 310, a processing device may receive a request from a driver to map the driver to a device memory of a device. The driver-to-device mapping may allow the driver to write data on the device memory via a bus. In some example, the bus is a Peripheral Component Interconnect (PCI) bus and the device is a PCI-compliant device. In one example, the driver is used by a user application. In another example, the driver supports a virtual machine.

At block 320, the processing device may map the driver to a random access memory (RAM) instead of mapping the driver to the device memory as requested by the driver. The driver-to-RAM mapping makes the driver to write the data to the RAM instead of the device memory of the device.

At block 330, the processing device may read contents of the RAM at a specified interval of time. That is, the processing device may poll (e.g., check status of) the RAM periodically. The polling may be done to determine whether the data written by the driver is accumulated in the RAM. At block 340, if it is determined that the data written by the driver is accumulated in the RAM, the processing device may then determine whether a bandwidth of the bus satisfies a bandwidth condition. For example, a bandwidth may satisfy the bandwidth condition if a measure of the bandwidth is equal to or more than a threshold value of the bandwidth. In some example, the bandwidth satisfies the bandwidth condition when an available bandwidth of the bus is equal to or greater than a first threshold bandwidth value. In some examples, the bandwidth satisfies the bandwidth condition when a current bandwidth of the bus is less than a second threshold bandwidth value.

At block 350, responsive to determining that the bandwidth of the bus satisfies the bandwidth condition, the processing device may forward a portion of the data written by the driver in the RAM to the device memory via the bus. In some example, forwarding the portion of the data can include sending the portion of the data in the RAM to the device memory to be stored in the device memory. In some example, forwarding the portion of the data can include swapping a portion of data in the registers of the device memory with the portion of the data in the RAM written by the driver. In some example, the processing device may overwrite the portion of the data written by the driver in the RAM with an invalid data that the driver is known not to write. Overwriting the portion in RAM with invalid data allows for identifying whether subsequent changes to the RAM are made by the driver by comparing the invalid data to the content of the RAM.

In some embodiments, responsive to determining that the bandwidth does not satisfy the bandwidth condition, the processing device may continue to monitor the bus bandwidth to determine whether the bandwidth changed to satisfy the bandwidth condition. Until the bandwidth is satisfied, the driver can remain mapped to the RAM and the writes from the driver can accumulate in the RAM.

Additionally, responsive to determining that the driver has not written to the RAM for a specified amount of time, the processing device can revert back to the driver-to-device mapping. If it is determined that the driver hasn't written to the RAM for a long enough time (as identified by the specified amount of time), the processing device can perform a write-protect operation on the RAM such that the driver is not allowed to further write to the RAM. Then the processing device may un-map the driver from the RAM and map the driver to the device memory such that the driver is to write directly to the device memory again until a change in the bandwidth of the bus is detected. Moreover, responsive to detecting a read request from the driver, the processing device can forward data from the RAM to the device memory so that the read request can retrieve the desired data that the driver intends to retrieve.

Referring to FIG. 4, method 400 may be performed by a processing device and may begin at block 410. At block 410, a processing device may determine whether a bandwidth of a bus satisfies a first bandwidth condition. In some examples, a driver may be mapped to a device memory of a device to write data to the device memory via the bus. In an example, the bus includes a Peripheral Component Interconnect (PCI) bus and the device includes a PCI-compliant device. In an example, the bandwidth of the bus may satisfy the first bandwidth condition if the bandwidth is equal to or greater than a first threshold value.

At block 420, responsive to a determination that the bandwidth does not satisfy the bandwidth condition, the processing device may un-map the driver that is mapped to the device memory and map the driver to a random access memory (RAM) of the main memory such that the driver is now to write the data to the RAM instead of the device memory.

At block 430, responsive to a determination that the data written by the driver is accumulated in the RAM, the processing device may determine whether the bandwidth of the bus changed to satisfy a second bandwidth condition. In an example, the bandwidth of the bus can change over time to satisfy a second bandwidth condition. For example, the second bandwidth condition can be satisfied if the bandwidth changes to be equal to or greater than a second threshold value. In an example, the first bandwidth value and the second bandwidth value may be different. While the first bandwidth value may be used to identify whether there is a PCI stall that necessitates mapping the driver to the RAM, the second threshold value may be used to identify whether it is an appropriate time to forward some of the data from the RAM to the device memory. As such, the two values may have different levels of threshold associated.

At block 440, responsive to a determination that the bandwidth of the bus changed to satisfy the second bandwidth condition, the processing device may forward a portion of the data written by the driver in the RAM to the device memory via the bus. In some example, forwarding the portion of the data can include sending the portion of the data in the RAM to the device memory to be stored in the device memory. In some example, forwarding the portion of the data can include swapping a portion of data in the registers of the device memory with the portion of the data in the RAM written by the driver. In some example, the processing device may overwrite the portion of the data written by the driver in the RAM with an invalid data that the driver is known not to write. The invalid data can be identified based on the particular device being used, the particular driver that is requesting the service, etc. In an example, an invalid data can include all zeroes for the value of an address space. Overwriting the portion in RAM with invalid data allows for identifying whether subsequent changes to the RAM are made by the driver by comparing the invalid data to the content of the RAM.

Additionally, responsive to determining that the driver has not written to the RAM for a specified amount of time, the processing device can revert back to the driver-to-device mapping. If it is determined that the driver hasn't written to the RAM for a long enough time (as identified by the specified amount of time), the processing device can perform a write-protect operation on the RAM such that the driver is not allowed to further write to the RAM. Then the processing device may un-map the driver from the RAM and map the driver to the device memory such that the driver is to write directly to the device memory again until a change in the bandwidth of the bus is detected. Moreover, responsive to detecting a read request from the driver, the processing device can forward data from the RAM to the device memory so that the read request can retrieve the desired data that the driver intends to retrieve.

Figure 5:
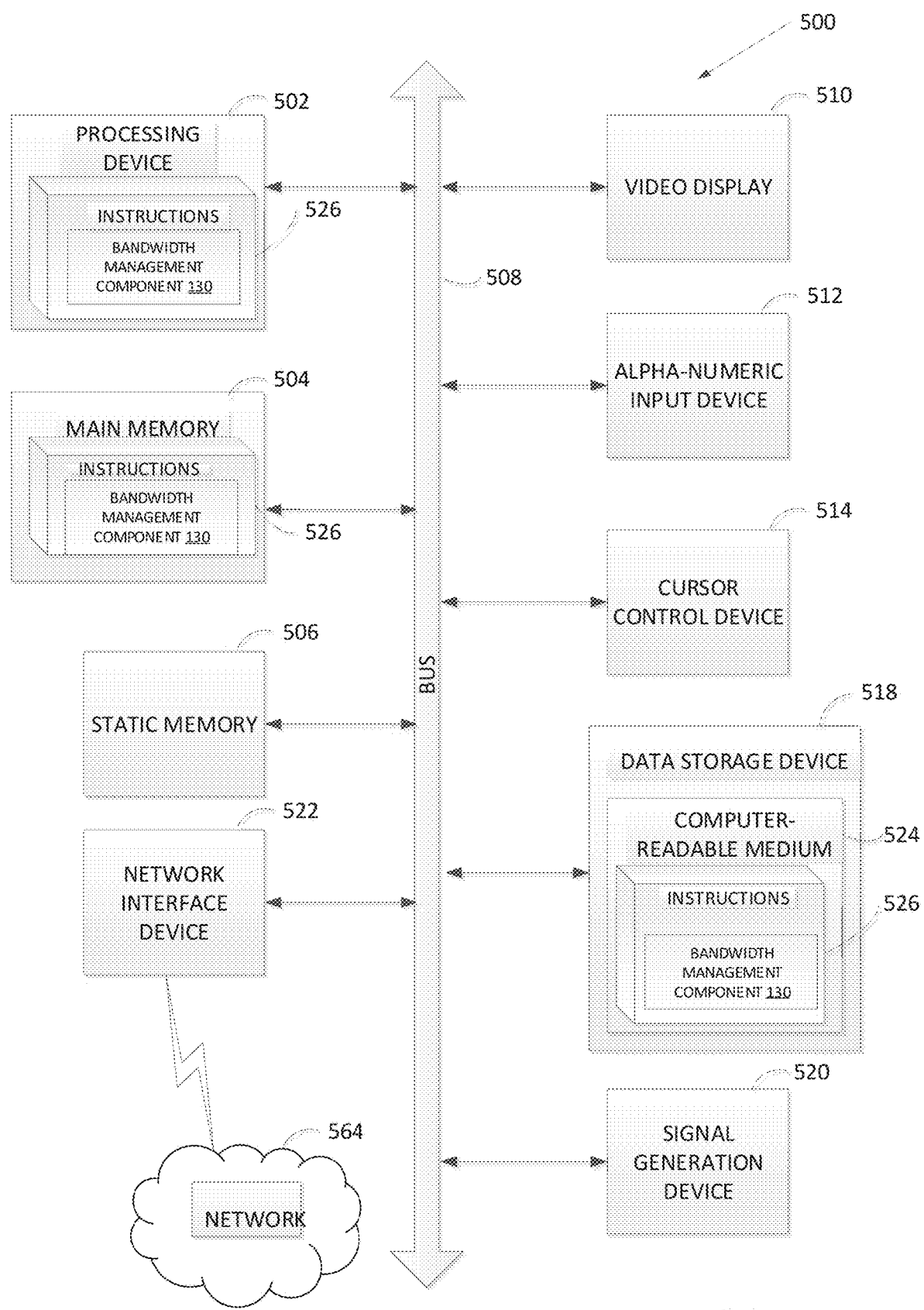
FIG. 5 depicts a block diagram of an illustrative computing device operating in accordance with the examples of the disclosure.

FIG. 5 depicts a block diagram of a computer system operating in accordance with one or more aspects of the disclosure. In various illustrative examples, computer system 500 may correspond to computing system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing methods 300 or 400 for bandwidth management component 130 of FIG. 1 and the modules illustrated in FIGS. 1 and 2.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method comprising:
   receiving, from a driver, a request pertaining to writing data to a device memory of a device via a bus;
   causing the driver to write the data to a random access memory (RAM);
   reading contents of the RAM at a specified interval of time to determine whether the data written by the driver is stored in the RAM;
   responsive to determining that the data written by the driver is stored in the RAM, determining whether a bandwidth of the bus satisfies a bandwidth condition; and
   responsive to determining that the bandwidth satisfies the bandwidth condition, forwarding, via the bus, a portion of the data written by the driver in the RAM to the device memory of the device.

2. The method of claim 1, further comprising:
   responsive to determining that the bandwidth does not satisfy the bandwidth condition, continue to monitor the bandwidth until determining that the bandwidth satisfies the bandwidth condition.

3. The method of claim 1, further comprising:
   overwriting the portion of the data written by the driver in the RAM with an invalid data that the driver is known not to write.

4. The method of claim 1, further comprising:
   mapping one or more addresses associated with the driver to the RAM to allow the driver to write the data to the RAM.

5. The method of claim 4, further comprising:
   responsive to determining that the driver has not written to the RAM for a specified amount of time:
     performing a write-protect operation on the RAM such that the driver is not allowed to write to the RAM; and
     un-mapping the one or more addresses associated with the driver from the RAM and mapping the one or more addresses associated with the driver to the device memory to allow the driver to write directly to the device memory until a change in the bandwidth of the bus is detected.

6. The method of claim 1, further comprising:
   responsive to detecting an access request from the driver, forwarding the data written by the driver in the RAM to the device memory.

7. The method of claim 1, wherein the driver supports a user application.

8. The method of claim 1, wherein the driver supports a virtual machine.

9. A system comprising:
a memory; and
a processing device operatively coupled to the memory, to:
receive, from a driver, a request pertaining to writing data to a device memory of a device via a bus;
cause the driver to write the data to a random access memory (RAM);
read contents of the RAM at a specified interval of time to determine whether the data written by the driver is stored in the RAM;
responsive to determining that the data written by the driver is stored in the RAM, determine whether a bandwidth of the bus satisfies a bandwidth condition; and
responsive to determining that the bandwidth satisfies the bandwidth condition, forward, via the bus, a portion of the data written by the driver in the RAM to the device memory of the device.

10. The system of claim 9, wherein the processing device is further to:
overwrite the portion of the data written by the driver in the RAM with an invalid data that the driver is known not to write.

11. The system of claim 9, wherein the processing device is further to:
map one or more addresses associated with the driver to the RAM to allow the driver to write the data to the RAM.

12. The system of claim 11, wherein the processing device is further to:
responsive to determining that the driver has not written to the RAM for a specified amount of time:
perform a write-protect operation on the RAM such that the driver is not allowed to write to the RAM; and
un-map the one or more addresses associated with the driver from the RAM and map the one or more addresses associated with the driver to the device memory to allow the driver to write directly to the device memory until a change in the bandwidth of the bus is detected.

13. The system of claim 9, wherein the processing device is further to:
responsive to detecting an access request from the driver, forward the data written by the driver in the RAM to the device memory.

14. A non-transitory computer-readable medium comprising instructions that, when executed by a processing device, cause the processing device to perform operations comprising:
receiving, from a driver, a request pertaining to writing data to a device memory of a device via a bus;
causing the driver to write the data to a random access memory (RAM);
reading contents of the RAM at a specified interval of time to determine whether the data written by the driver is stored in the RAM;
responsive to determining that the data written by the driver is stored in the RAM, determining whether a bandwidth of the bus satisfies a bandwidth condition; and
responsive to determining that the bandwidth satisfies the bandwidth condition, forwarding, via the bus, a portion of the data written by the driver in the RAM to the device memory of the device.

15. The non-transitory computer-readable medium of claim 14, wherein the processing device is to perform further operations comprising:
overwriting the portion of the data written by the driver in the RAM with an invalid data that the driver is known not to write.

16. The non-transitory computer-readable medium of claim 14, wherein the processing device is to perform further operations comprising:
mapping one or more addresses associated with the driver to the RAM to allow the driver to write the data to the RAM.

17. The non-transitory computer-readable medium of claim 16, wherein the processing device is to perform further operations comprising:
responsive to determining that the driver has not written to the RAM for a specified amount of time:
performing a write-protect operation on the RAM such that the driver is not allowed to write to the RAM; and
un-mapping the one or more addresses associated with the driver from the RAM and mapping the one or more addresses associated with the driver to the device memory to allow the driver to write directly to the device memory until a change in the bandwidth of the bus is detected.

18. The non-transitory computer-readable medium of claim 14, wherein the processing device is to perform further operations comprising:
responsive to detecting an access request from the driver, forwarding the data written by the driver in the RAM to the device memory.

19. The non-transitory computer-readable medium of claim 14, wherein the bandwidth satisfies the bandwidth condition when an available bandwidth of the bus is equal to or greater than a first threshold bandwidth value.

20. The non-transitory computer-readable medium of claim 14, wherein the bandwidth satisfies the bandwidth condition when a current bandwidth of the bus is less than a second threshold bandwidth value.

* * * * *